(12) United States Patent
Morton

(10) Patent No.: US 6,272,101 B1
(45) Date of Patent: Aug. 7, 2001

(54) METHOD AND DEVICE FOR INSTANTLY ENCODING DIGITIZED INFORMATION ON A STAMPER FROM WHICH COMPACT DISCS CAN BE MADE

(75) Inventor: Edward W. Morton, Turnersville, NJ (US)

(73) Assignees: Sony Corporation, Tokyo (JP); Sony Electrons, Inc., Park Ridge, NJ (US)

( * ) Notice: Subject to any disclaimer, the term of this patent is extended or adjusted under 35 U.S.C. 154(b) by 0 days.

(21) Appl. No.: 09/210,839

(22) Filed: Dec. 15, 1998

(51) Int. Cl.[7] ............................................. G11B 7/12
(52) U.S. Cl. ................ 369/121; 369/112.23; 369/44.14; 369/44.23
(58) Field of Search ....................... 369/59, 47, 48, 369/49, 54, 58, 44.12, 44.14, 44.23, 44.25, 44.27, 44.28, 44.37, 112, 112.01, 112.23, 112.24, 112.26, 116, 121

(56) References Cited

U.S. PATENT DOCUMENTS

| 4,550,249 | * | 10/1985 | Damen et al. | 369/112 |
| 5,494,782 | | 2/1996 | Maenza et al. | 430/321 |
| 5,526,182 | * | 6/1996 | Jewell et al. | 359/621 |

\* cited by examiner

*Primary Examiner*—Muhammad Edun
(74) *Attorney, Agent, or Firm*—Ronald P. Kananen; Rader, Fishman & Grauer

(57) ABSTRACT

An apparatus and method for mass producing optically readable discs includes providing an array of light emitting devices which are arranged in a spiral pattern corresponding to the spiral track along which data is recorded on optically readable discs. The light emitting devices of the array are driven selectively to expose a layer of photoresist on a substrate. The light is focused on the substrate by an array of micro-lenses corresponding to the array of light emitting devices. When the photoresist on the substrate is developed, it can either by cured for use as a stamper or metallized for use in forming, in succession, a father, a mother and a stamper.

17 Claims, 2 Drawing Sheets

METHOD AND DEVICE FOR INSTANTLY ENCODING DIGITIZED INFORMATION ON A STAMPER FROM WHICH COMPACT DISCS CAN BE MADE

FIELD OF THE INVENTION

The present invention relates to the field of compact disc manufacture. More specifically, the present invention relates to the field of compact disc mass production using a stamper.

BACKGROUND OF THE INVENTION

In order to mass-produce optical discs such as those of the compact disc family (e.g., CD Audio, CD ROM, Video CD, CD-I, CD-MO, MD, etc.) a reliable mastering process is required. Unfortunately, conventional compact disc mastering techniques involve numerous complicated and time-consuming steps.

FIG. 1 depicts the basic processing steps in creating a compact disc master from which other discs can be mass-produced. The first step involves providing a circular glass substrate 12 approximately nine and one-half inches in diameter. The substrate 12 must be cleaned, dried and then carefully subjected to a visual inspection for imperfections, surface smoothness and the like.

An adhesive layer coating (not shown) is then placed on one surface of the glass 12 according to strict tolerances. A photo-resistive coating 22 is then deposited over the adhesive layer as shown in step 20. This photo-resistive coating 22 must also be carefully inspected to insure that it is evenly and continuously applied across the surface of the substrate 12.

The glass substrate 12 must then be appropriately cured and sampled to insure that its thickness conforms to the required tolerance. The steps of applying the coating to the substrate and sampling the coating require significant time and must be precisely performed.

After curing, in step 30, laser beam recording (LBR) takes place. LBR involves the selective exposure of the photo-resistive coating to the beam 32 of a laser (not shown) in order to form the appropriate pattern of pits and lands that represent the data recorded on an optical disc. The laser is typically a continuous wave laser with exposure of its beam to the photo-resistive coating 22 controlled by an acusto-optic modulator (AOM) (not shown).

The AOM acts as an electronic shutter to the laser beam and, as is well-known by those skilled in the art, is controlled by a string of binary 1's and 0's generated by an encoder (also not shown). The binary 1's and 0's represent the data being recorded and correspond to the pits and lands formed in a recorded optical disc.

After the photo-resistive coating 22 has been selectively exposed to the laser as described above, the photo-resistive coating 22 must next be developed so that the exposed portions can be removed. Developing is accomplished in step 40 by placing the substrate 12 in a caustic sodium hydroxide solution. Again, after developing the glass must be inspected. This time by measuring the diffraction orders of the tracks, among other things.

The next step 50 is a metalization step and involves placing a thin coating of silver or nickel 52 over the entire surface of the substrate 12 such that it follows the pattern of pits and lands of the now developed photo-resistive layer 22. In the case of silver, this is accomplished by well-known evaporation techniques. The evaporation results in the formation of the metal coating 52 typically 120 nanometers thick. At this point, the metalized substrate or the "glass master" is typically "played" in a specially adapted CD player to insure that the pits have been properly formed. It is only at this point, after the time and expense of each of the above steps, that the accuracy of the recording can be determined. Additionally, a visual inspection takes place to further confirm the accuracy of the production.

In steps 60 and 70, a nickel plating 62 is formed via electroplating over the metalized glass such that a metal master 64, with pits and lands opposite to those of the metalized glass plate, is formed when it is removed from the substrate. This metal master is also known as a "father" and is formed by well-known electroplating procedures.

Another inspection is required at this point to insure the father has been properly formed. Because the extremely thin silver or nickel metalization 52 forming the glass master is lost to the father during the nickel plating which forms the father, there can be only one father.

From the metal master or father 64, a so-called "mother" 82 is formed also out of nickel as shown in step 80. The mother 82 is simply the inverse of the metal master or father and is similarly formed by electroplating. Several mothers can be formed from the metal master or father, however, each must be inspected to insure that it has been properly formed.

Up to this point in the process there have been no less than six detailed inspections involving numerous processing steps. Generally, the processing steps up to this point typically require seven to nine hours of intensive labor.

Finally, in step 90 nickel stampers 92 are formed from the mothers 82. The stampers 92 are again simply an inverse of the mother 82 formed by electroplating the same. From the stampers, compact discs can be manufactured by injection molding melted resin, e.g., optical quality polycarbonate, at high pressure into a mold comprising the stamper and allowing it to solidify.

As can be observed from the above-steps, before mothers 82 or stampers 92 are formed, numerous steps must be undertaken. Unfortunately, any small variation in the process conditions, equipment alignment, etc., can result in failure of the entire process, therefore, yields tend to be less than ideal.

One alternative known by those skilled in the art involves reducing the required number of steps to reach the mother and, therefore, the stamper stage. This alternative, however, begins with first placing a coating over the glass substrate and thus involves steps analogous to steps 10 and 20 as described above. Specifically, a glass substrate 12 is first provided, cleaned, dried and inspected thoroughly. Then a coating is placed along one surface of the glass substrate 12 and cured. However, in this case the coating is a non-photo-resistive coating compared to the photo-resistive coating 22 of FIG. 1.

Next, the coating is selectively subjected to a laser beam. Instead of merely exposing the coating as described in step 30 above, the laser beam in this case actually vaporizes the coating. Thus, pits are formed (and lands are left) directly in the non-photo-resistive coating. Accordingly, there is no need for developing and step 40 can be skipped.

Because the pits are actually formed at this stage, i.e., there is a physical or mechanical change of the coating, a read laser immediately down-stream from the recording laser, i.e., the laser vaporizing selective portions of the coating, can be used to verify the accuracy of the vaporization process by reading or "playing" the disc. Thus, if a serious mistake is made at this early stage, the process can immediately be aborted. Additionally, this laser allows feedback to control exposure, power and other beam parameters of the recording (ablating) laser. While this alternative technique eliminates some processing time, i.e., for the developing process, the glass substrate must still be coated and creation of the father or metal master 64 (steps 60 and 70) must still take place before mothers 82 or stampers 92 can be formed.

Finally, another alternative known by those skilled in the art is to apply a conductive coating to a glass substrate and perform direct laser ablation of this conductive coating. See, U.S. Pat. No. 5,494,782 (incorporated herein by reference). While this alternative avoids the need for metalizing with silver, for example, the troublesome and time consuming steps of properly applying and ablating the coating still must be undertaken. Accordingly, it would be advantageous to be able to directly form a stamper without first forming a father or mother, and without the need to ablate a conductive coating.

SUMMARY OF THE INVENTION

It is an object of the present invention to meet the above-described needs and others. Specifically, it is an object of the present invention to provide a method and apparatus whereby optically-readable discs, such as the discs in the compact disc family, can be mass-produced more quickly and less expensively then previously.

Additional objects, advantages and novel features of the invention will be set forth in the description which follows or may be learned by those skilled in the art through reading these materials or practicing the invention. The objects and advantages of the invention may be achieved through the means recited in the attached claims.

To achieve these stated and other objects, the present invention may be embodied and described as an apparatus for producing optically-readable discs including: an array of light emitting devices arranged in a spiral track corresponding the spiral track along which data is recorded on an optical disc; and a processor for receiving a digital signal to be recorded on an optical disc and for selectively driving the light emitting devices in accordance with the digital signal. Preferably, the light emitting devices are light emitting diodes with a wavelength of approximately 455 nm.

An array of micro-lenses corresponding to the array of light emitting devices is preferably used to focus the light from the light emitting devices on a substrate. The substrate has a layer of photoresist deposited thereon which is exposed to light from the array of light emitting.

The present invention also comprises the method of exposing the substrate and subsequently using the exposed substrate to form optical discs. The method of the present invention may be described as exposing a substrate having a layer of photoresist thereon with an array of light emitting devices which are arranged in a spiral corresponding to the spiral track along which data is recorded on an optically readable disc. Again, the light emitting devices of the array are driven according to a digital data signal to be recorded on an optically readable disc.

After the exposure step, the method continues with the step of developing the photoresist layer. The developed photoresist layer may then be subjected to curing and hardening to form a stamper. The method then concludes with the step of producing an optically readable disc by injecting resin for forming such a disc into a mold comprising the stamper. Alternatively, the developed photoresist layer may be metallized to form, in succession, a father, a mother and a stamper.

BRIEF DESCRIPTION OF THE DRAWINGS

The accompanying drawings illustrate the present invention and are a part of the specification. Together with the following description, the drawings demonstrate and explain the principles of the present invention.

DETAILED DESCRIPTION OF THE PREFERRED EMBODIMENTS

Using the drawings, the preferred embodiments of the present invention will now be explained.

Figure 1:
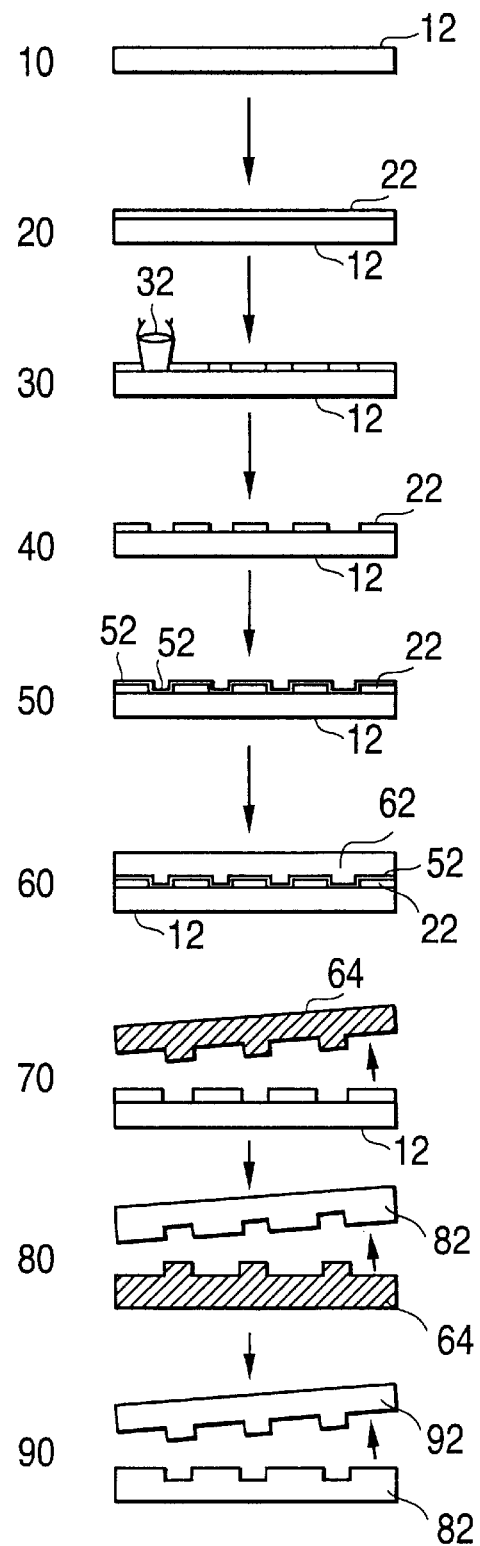
FIG. 1 illustrates the conventional process for forming a stamper for the mass production of compact discs.
Figure 2:
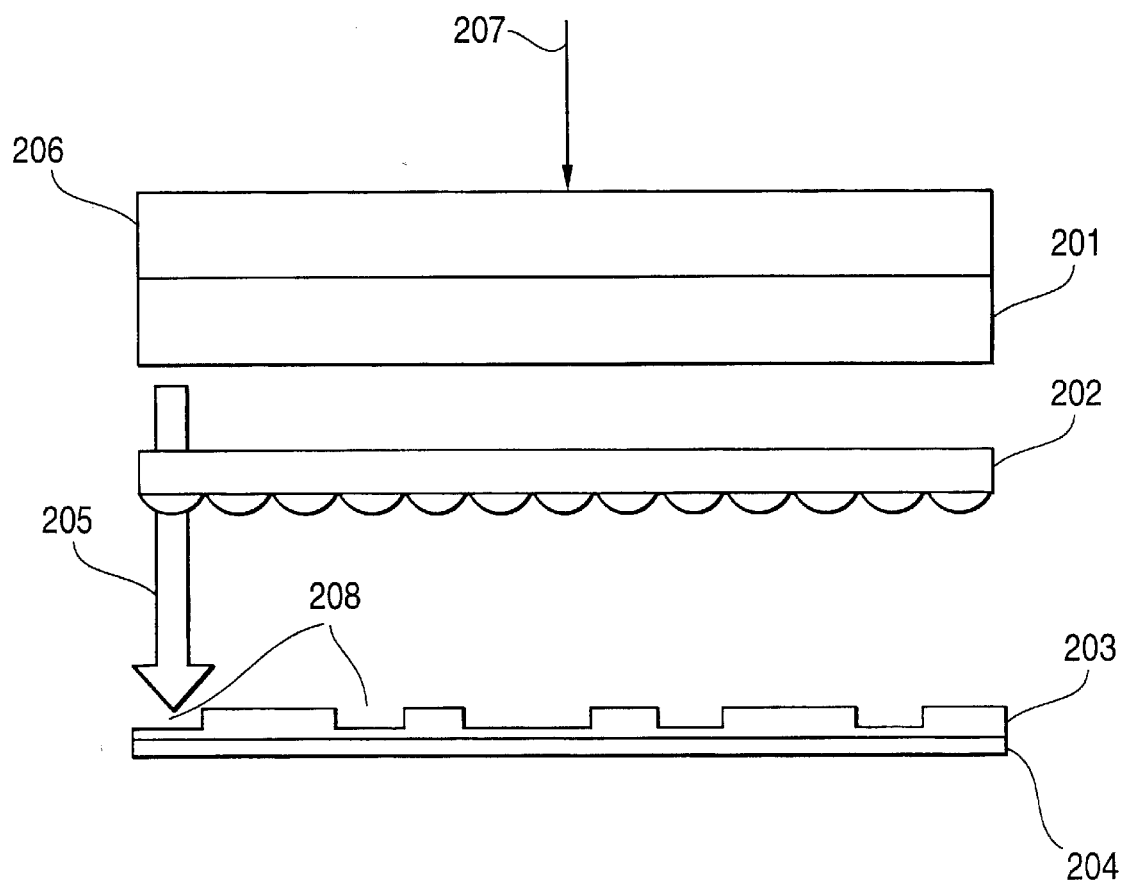
FIG. 2 illustrates an apparatus for creating a stamper for the mass production of compact discs according to the principles of the present invention.

FIG. 2 illustrates an apparatus according to the present invention that can be used to form a stamper for the mass production of compact discs. The apparatus includes an array of light emitting diodes 201. The light emitting diodes (LEDs) of the array 201 are arranged in a spiral track corresponding to the track or tracks of recorded information on a compact disc. Each LED is preferably a blue LED that emits light with a wavelength of approximately 455 nm.

A processor 206 is connected to and drives the LED array 201. The processor 206 receives a digital signal 207 that represents the data to be recorded on a run of compact discs. The digital signal 207 may be any type of signal which is recorded to generate any of the types of discs in the compact disc family. For example, the digital signal 207 may be an audio signal for generating an audio compact disc, an audio-visual signal for generating a DVD video disc, or a signal representing computer programming or computer-readable data for generating a CD-ROM disc.

As described above, the data stream of 1's and 0's represented by the digital signal 207 must be converted to a series of pits and lands arranged as a spiral track on a compact disc in order to record the data of the signal 207 on the disc in a retrievable or readable form. Consequently, upon receipt of the digital signal 207, the processor 206 will drive selected LEDs in the array 201 to correspond to the pattern of the 1's or the 0's of the digital signal. Consequently, all the data to be recorded on mass-produced optical discs is transferred to a substrate 204 simultaneously rather than being written one data bit at a time by a laser beam.

The LED array 201 is optically coupled to a corresponding array of micro-lenses 202. Each micro-lens in the array 202 is optically coupled with an LED in the array 201. The micro-lenses of the array 202 are arranged in a spiral corresponding to the spiral track of a compact disc and the spiral arrangement of the LEDs in the LED array 201.

Each micro-lens should have a diameter greater than that of the corresponding LED. For example, a micro-lens of 20 $\mu$m focusing the light of a 15 $\mu$m diode results in a pit with a 3 $\mu$m diameter. As micro-lens and LED technology advance the principles of the present invention will allow information to be stored more and more densely on a compact disc.

Alternatively, pits of 25 $\mu$m diameter provide the best quality recording for audio applications and can easily be produced using the principles of the present invention. However, disc playing devices would also have to be adapted to read such a pit size and the accompanying change in track pitch that would be required.

As shown in FIG. 2, light 205 from a selected LED that is being driven to emit light by the processor 206 is focused by a corresponding micro-lens in array 202 on a substrate 204. A layer of photoresist 203 previously deposited on the substrate 204 is thus selectively exposed by the light from the array 201. After light 205 from the LED array 201 has denatured the illuminated portions of the photoresist 203, the photoresist is developed to form pits 208. Portions of the photoresist which were not exposed to light 205 remain as lands intervening between the pits.

The pattern of pits 208 formed on the substrate 204 may correspond to a pattern of pits to be formed on a compact disc or, alternatively, may correspond to the pattern of lands to be formed on a compact disc. If the pattern of pits 208 on the substrate 204 corresponds to the lands on a compact disc to be formed, and vice versa, the substrate 204 can be formed immediately into a stamper.

This is accomplished by curing and hardening the substrate 204 and the developed photoresist layer 203. In practice the curing and hardening should require approximately 17 minutes. The resulting stamper has sufficient durability to produce around 5,000 compact discs. If longer runs are necessary, additional stampers can be made using the foregoing process of the present invention.

Alternatively, if the pattern of pits 208 on the substrate corresponds to the pattern of pits desired on a compact disc to be formed, the substrate 204 and developed photoresist layer 203 can be metallized according to the conventional process. A father, one or more mothers and one or more stampers can then be made from the substrate 204 and the developed photoresist layer 203 as has been done conventionally in the art.

Using this method, mass-produced discs in runs of a million discs or more can be produced. This eliminates the 50 to 90 minutes conventionally taken for a single laser beam to "write" data to the photoresist of a glass master.

The preceding description has been presented only to illustrate and describe the invention. It is not intended to be exhaustive or to limit the invention to any precise form disclosed. Many modifications and variations are possible in light of the above teaching.

The preferred embodiment was chosen and described in order to best explain the principles of the invention and its practical application. The preceding description is intended to enable others skilled in the art to best utilize the invention in various embodiments and with various modifications as are suited to the particular use contemplated. It is intended that the scope of the invention be defined by the following claims.

What is claimed is:

1. An apparatus for producing optically-readable discs, comprising:
   an array of light emitting devices, spirally arranged corresponding a spiral track, along which data is recorded, on a disc; and
   a processor for receiving a digital signal to be recorded on said disc and for selectively driving said light emitting devices in accordance with said digital signal.

2. The apparatus of claim 1, further comprising an array of spirally-arranged micro-lenses corresponding to said array of light emitting devices for focusing light from said light emitting devices on a substrate.

3. The apparatus of claim 1, wherein said light emitting devices are light emitting diodes.

4. The apparatus of claim 1, wherein said light emitting devices emit light with a wavelength of approximately 455 nm.

5. The apparatus of claim 2, further comprising said substrate, said substrate having a layer of photoresist deposited thereon which is exposed to light from said array of light emitting devices which has been focused by said array of micro-lenses.

6. A method of recording information on an optically readable disc comprising exposing a substrate having a layer of photoresist thereon with an array of spirally-arranged light emitting devices corresponding to a spiral track along which data is recorded on an optically readable disc, wherein said light emitting devices of said array are driven according to a digital data signal to be recorded on said optically readable disc.

7. The method of claim 6, further comprising developing said photoresist layer.

8. The method of claim 7, further comprising curing and hardening said developed photoresist layer to form a stamper.

9. The method of claim 8, further comprising producing an optically readable disc by injecting material for forming such a disc into a mold comprising said stamper.

10. The method of claim 7, further comprising using said substrate and developed photoresist layer to form, in succession, a father, a mother and a stamper.

11. The method of claim 6, further comprising driving said array of light emitting devices with a processor which receives said digital data signal.

12. The method of claim 6, further comprising focusing light from said array of light emitting devices on said substrate with an array of spirally-arranged micro lenses.

13. An apparatus for producing optically readable discs, comprising:
   light emitting means spirally arranged to selectively emit light along a spiral track corresponding a spiral track along which data is recorded on a disc; and
   means for receiving a digital signal to be recorded on said disc and for selectively driving said light emitting means in accordance with said digital signal.

14. The apparatus of claim 13, further comprising a focusing means corresponding to said light emitting means for focusing light from said light emitting means on a substrate.

15. The apparatus of claim 13, wherein said light emitting means comprise an array of light emitting diodes.

16. The apparatus of claim 13, wherein said light emitting means emit light with a wavelength of approximately 455 nm.

17. The apparatus of claim 14, further comprising said substrate, said substrate having a layer of photoresist deposited thereon which is exposed to light from said light emitting means which has been focused by said focusing means.

* * * * *